US011867953B2

(12) United States Patent
Masselin et al.

(10) Patent No.: US 11,867,953 B2
(45) Date of Patent: Jan. 9, 2024

(54) MECHANICAL TRANSFER FERRULE BASED OPTICAL SWITCH

(71) Applicant: Viavi Solutions France SAS, Plaisir (FR)

(72) Inventors: Olivier Masselin, Saint Jean Bonnefonds (FR); Alexandre Cebollada, La Talaudiere (FR)

(73) Assignee: Viavi Solutions France SAS, Plaisir (FR)

( * ) Notice: Subject to any disclaimer, the term of this patent is extended or adjusted under 35 U.S.C. 154(b) by 0 days.

(21) Appl. No.: 17/566,405

(22) Filed: Dec. 30, 2021

(65) Prior Publication Data

US 2022/0128775 A1 Apr. 28, 2022

Related U.S. Application Data

(63) Continuation of application No. 16/776,259, filed on Jan. 29, 2020, now Pat. No. 11,243,361.

(30) Foreign Application Priority Data

Dec. 18, 2019 (EP) ..................... 19306679

(51) Int. Cl.
*G02B 6/32* (2006.01)
*G02B 6/35* (2006.01)
*G02B 6/38* (2006.01)

(52) U.S. Cl.
CPC ............. *G02B 6/3885* (2013.01); *G02B 6/32* (2013.01); *G02B 6/3508* (2013.01);
(Continued)

(58) Field of Classification Search
CPC ...... G02B 6/32; G02B 6/3508; G02B 6/3548; G02B 6/3558; G02B 6/3568;
(Continued)

(56) References Cited

U.S. PATENT DOCUMENTS 6,307,982 B1 * 10/2001 Takahashi ............ G02B 6/3508
385/16
6,954,262 B2 10/2005 Buzzetti
(Continued)

FOREIGN PATENT DOCUMENTS

JP S63294511 12/1988

OTHER PUBLICATIONS

UDCONEC, Customer Drawing, Hickory, NC, USA, Jul. 16, 2018 and Oct. 29, 2018, 2 pages.
(Continued)

*Primary Examiner* — Ryan A Lepisto
(74) *Attorney, Agent, or Firm* — Mannava & Kang, P.C.

(57) ABSTRACT

In some examples, a mechanical transfer ferrule based optical switch may include an optical fiber tube unit connectable to an end of an optical fiber. The optical fiber tube unit may include a lens to transmit light through the optical fiber. An optical fiber tube unit positioning assembly may include an optical fiber tube unit support detachably connectable to the optical fiber tube unit, and an optical fiber tube unit guide to operatively position the optical fiber tube unit support relative to a multi-fiber connector. The optical fiber tube unit guide may align the optical fiber tube unit and the lens to a specified lens of the multi-fiber connector, and connect the optical fiber to a specified optical fiber channel.

17 Claims, 9 Drawing Sheets

(52) U.S. Cl.
CPC ......... *G02B 6/3548* (2013.01); *G02B 6/3558* (2013.01); *G02B 6/3568* (2013.01); *G02B 6/3588* (2013.01); *G02B 6/381* (2013.01); *G02B 6/3853* (2013.01); *G02B 6/3874* (2013.01); *G02B 6/3882* (2013.01)

(58) Field of Classification Search
CPC .... G02B 6/3588; G02B 6/381; G02B 6/3853; G02B 6/3874; G02B 6/3882; G02B 6/3885
See application file for complete search history.

(56) References Cited

U.S. PATENT DOCUMENTS

| | | | |
|---|---|---|---|
| 6,961,486 B2* | 11/2005 | Lemoff | G02B 6/3508 385/60 |
| 7,113,273 B2 | 9/2006 | Pahk | |
| 7,239,788 B2 | 7/2007 | Villeneuve | |
| 7,681,482 B1 | 3/2010 | Kubinski | |
| 8,123,417 B2* | 2/2012 | Wertman | G02B 6/3869 385/60 |
| 8,280,205 B2* | 10/2012 | Erdman | G02B 6/3853 385/74 |
| 8,699,012 B2 | 4/2014 | Duis | |
| 9,151,694 B2 | 10/2015 | Wilson | |
| 9,341,542 B2 | 5/2016 | Wu | |
| 9,846,281 B2 | 12/2017 | Murray | |
| 2002/0181841 A1 | 12/2002 | Lemoff | |
| 2010/0316334 A1 | 12/2010 | Kewitsch | |

OTHER PUBLICATIONS

Dirk Schoellner, et al., Performance Methodology and Characterization of a Multi-Fiber Expanded Beam Lensed Optical Interconnect, Hickory, NC, USA, 2016 IEEE, Effective date Mar. 17, 2017, 8 pages.

\* cited by examiner

900

RECEIVE IDENTIFICATION OF A SPECIFIED OPTICAL FIBER CHANNEL
902

ALIGN, BASED ON THE SPECIFIED OPTICAL FIBER CHANNEL, BY AN OPTICAL FIBER TUBE UNIT POSITIONING ASSEMBLY, AN OPTICAL FIBER TUBE UNIT CONNECTABLE TO AN END OF AN OPTICAL FIBER TO A SPECIFIED LENS OF A MULTI-FIBER CONNECTOR
904

CONNECT, BASED ON THE ALIGNMENT OF THE OPTICAL FIBER TUBE UNIT TO THE SPECIFIED LENS OF THE MULTI-FIBER CONNECTOR, THE OPTICAL FIBER TO THE SPECIFIED OPTICAL FIBER CHANNEL
906

*FIG. 9*

MECHANICAL TRANSFER FERRULE BASED OPTICAL SWITCH

PRIORITY

This application is a Continuation Application of U.S. application Ser. No. 16/776,259, filed Jan. 29, 2020, which claims priority under 35 U.S.C. 119(a)-(d) to European patent application number 19306679.2, having a filing date of Dec. 18, 2019, the disclosures of which are hereby incorporated by reference in their entireties.

BACKGROUND

Optical switches may include devices that selectively switch optical signals from one channel to another. Similarly, optical switches may include devices that selectively switch optical signals on or off. Examples of types of optical switches may include an optical modulator, an optical router, etc.

BRIEF DESCRIPTION OF DRAWINGS

Features of the present disclosure are illustrated by way of example and not limited in the following figure(s), in which like numerals indicate like elements, in which:

FIG. 9 illustrates a flowchart of an example method for implementing a mechanical transfer ferrule based optical switch in accordance with an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Mechanical transfer ferrule based optical switches, and methods for implementing mechanical transfer ferrule based optical switches are disclosed herein. The switches and methods disclosed herein provide for utilization of a lensed multi-fiber MT connector (also referred to herein as "multi-fiber connector") to implement an optical switch.

With respect to optical switches generally, a 1*N electro-mechanical optical switch may include an (N+1) fiber tube assembly associated to lenses. Assembly of such an optical switch may include fiber polishing, gluing of a fiber in a tube, gluing of a lens at a precise position from a fiber end, calibration of all output positions, etc., and implementation of these processes for each fiber of the optical switch. Assembly of such an optical switch may also include utilization of a relatively complex holder for the lenses and the fiber tube assemblies. In this regard, it is technically challenging to reduce the aforementioned assembly requirements for an optical switch.

In order to address the aforementioned technical challenges, the switches and methods disclosed herein may utilize a multi-fiber connector instead of an N fiber tube assembly and N lenses.

For the switches and methods disclosed herein, one unique optical fiber tube unit and a lens may be assembled. The unique optical fiber tube unit and lens may be moved in front of a selected lens (e.g., specified lens) of the opposite multi-fiber connector to connect to a specified optical fiber channel. Movements may be performed in two dimensions (X, Y), but the course travels may be relatively small (e.g., a few mm), which may make the movement of the input optical fiber small, and therefore increase the overall reliability of the input optical fiber.

The positioning of the optical fiber tube unit and lens by an optical fiber tube unit guide may utilize the positioning (e.g., holes or male pins) components of the multi-fiber connector.

Figure 1:
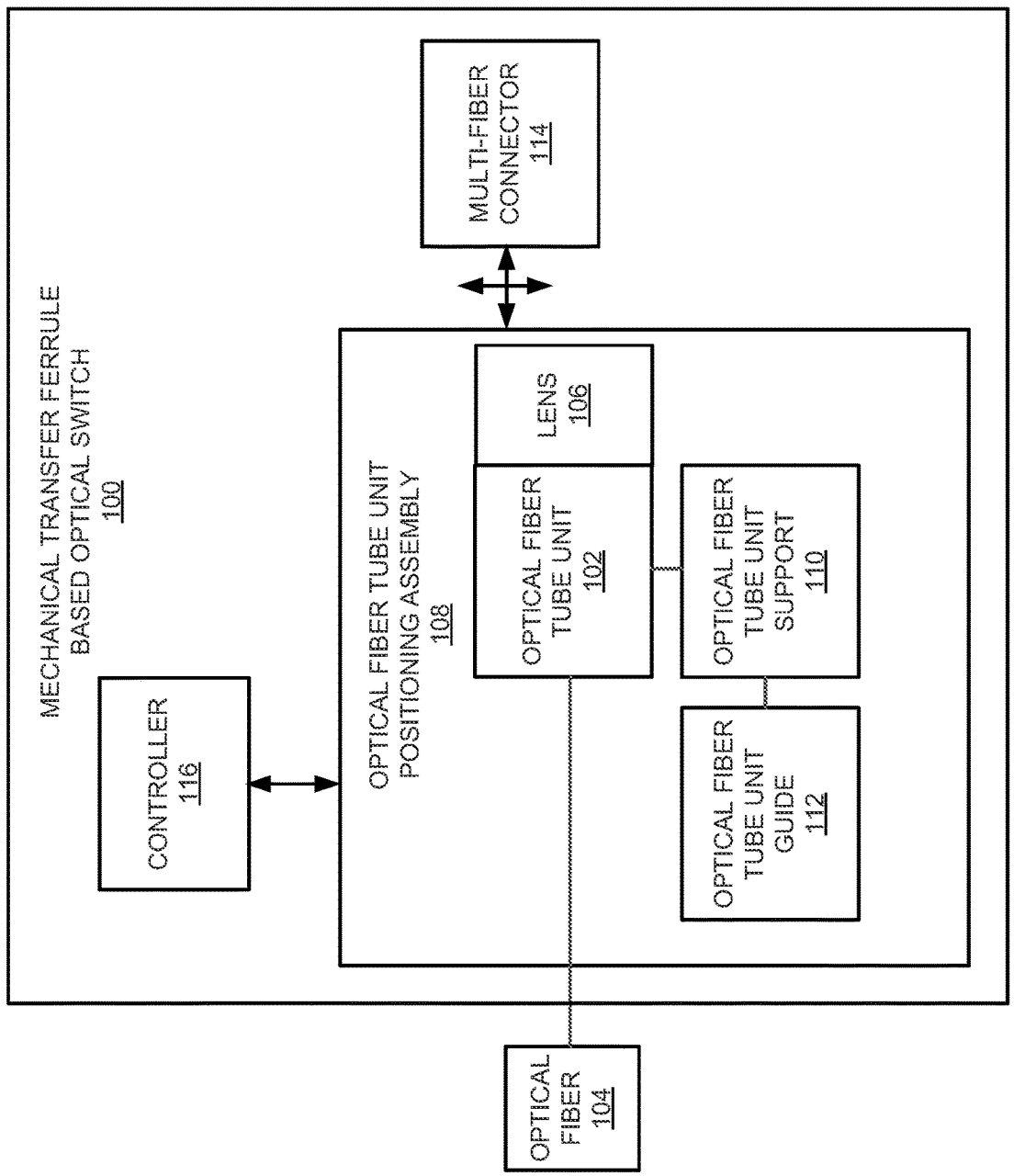
FIG. 1 illustrates an operational layout of a mechanical transfer ferrule based optical switch in accordance with an example of the present disclosure.

FIG. 1 illustrates an operational layout of a mechanical transfer ferrule based optical switch (hereinafter also referred to as "switch 100") in accordance with an example of the present disclosure.

Referring to FIG. 1, the switch 100 may include an optical fiber tube unit 102 connectable to an end of an optical fiber 104. The optical fiber tube unit 102 may include a lens 106 to transmit light through the optical fiber 104.

An optical fiber tube unit positioning assembly 108 may include an optical fiber tube unit support 110 detachably connectable to the optical fiber tube unit 102. Further, the optical fiber tube unit positioning assembly 108 may include an optical fiber tube unit guide 112 to operatively position the optical fiber tube unit support 110 relative to a multi-fiber connector 114 to align the optical fiber tube unit 102 and the lens 106 to a specified lens of the multi-fiber connector 114, and to connect the optical fiber 104 to a specified optical fiber channel.

A controller 116 may control operation of components such as the optical fiber tube unit support 110 and the optical fiber tube unit guide 112 of the optical fiber tube unit positioning assembly 108, for example, to operatively position the optical fiber tube unit support 110 relative to a multi-fiber connector 114 to align the optical fiber tube unit 102 and the lens 106 to a specified lens of the multi-fiber connector 114.

According to examples disclosed herein, the optical fiber tube unit support 110 may include a translation element to further operatively position the optical fiber tube unit 102 and the lens 106 relative to the multi-fiber connector 114.

According to examples disclosed herein, the optical fiber tube unit support 110 may include a translation element to move (e.g., as controlled by the controller 116) the optical fiber tube unit 102 and the lens 106 in a first direction relative to the multi-fiber connector 114. Further, the optical fiber tube unit guide 112 may include another translation element to move (e.g., as controlled by the controller 116) the optical fiber tube unit support 110 in a second direction relative to the multi-fiber connector 114. The second direction may be generally orthogonal to the first direction.

According to examples disclosed herein, the optical fiber tube unit positioning assembly 108 may include a protrusion to align to a positioning slot in the multi-fiber connector 114.

According to examples disclosed herein, the optical fiber tube unit positioning assembly may include an indentation to align to a positioning pin of the multi-fiber connector 114.

According to examples disclosed herein, the multi-fiber connector 114 may include a single row of lenses including the specified lens.

According to examples disclosed herein, the multi-fiber connector 114 may include a plurality of rows of lenses including the specified lens.

According to examples disclosed herein, the optical fiber tube unit 102 may be connectable to the optical fiber 104 that includes a multimode fiber.

According to examples disclosed herein, the optical fiber tube unit 102 may be connectable to the optical fiber 104 that includes a single mode fiber.

Operation of the switch 100 is described in further detail with reference to FIGS. 1-8.

Figure 2:
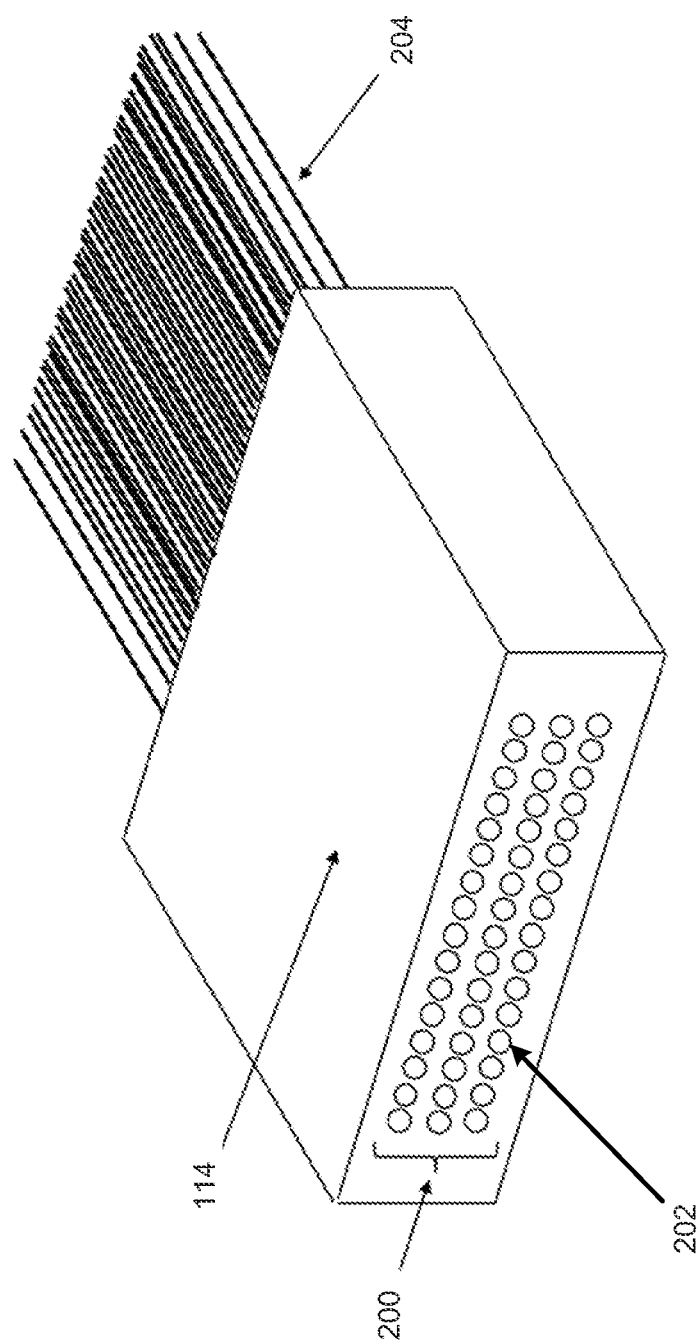
FIG. 2 illustrates a lensed multi-fiber MT connector (also referred to herein as "multi-fiber connector") of the mechanical transfer ferrule based optical switch of FIG. 1 in accordance with an example of the present disclosure.

FIG. 2 illustrates the multi-fiber connector 114 of the switch 100 in accordance with an example of the present disclosure.

Referring to FIG. 2, the multi-fiber connector 114, which may be a lensed mufti-fiber MT connector, may include a lensed fiber array 200. Each lens 202 of the lensed fiber array 200 may be communicatively connected to an optical fiber of the optical fibers 204.

Figure 3:
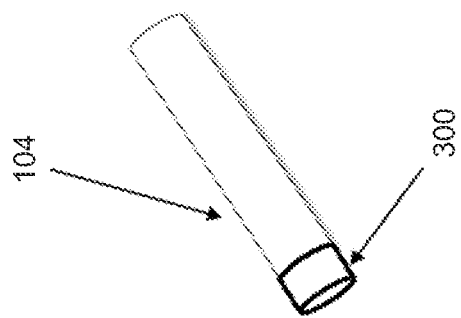
FIG. 3 illustrates an optical fiber usable with the mechanical transfer ferrule based optical switch of FIG. 1 in accordance with an example of the present disclosure.

FIG. 3 illustrates an optical fiber usable with the switch 100 in accordance with an example of the present disclosure.

Referring to FIG. 3, the optical fiber 104 may include a lens 300. The lens 300 may be disposed at one or both ends of the optical fiber 104. For example, for the optical fiber tube unit 102 that includes the lens 106, the optical fiber 104 may not utilize an additional lens at the end that is connected to the optical fiber tube unit 102.

Figure 4:
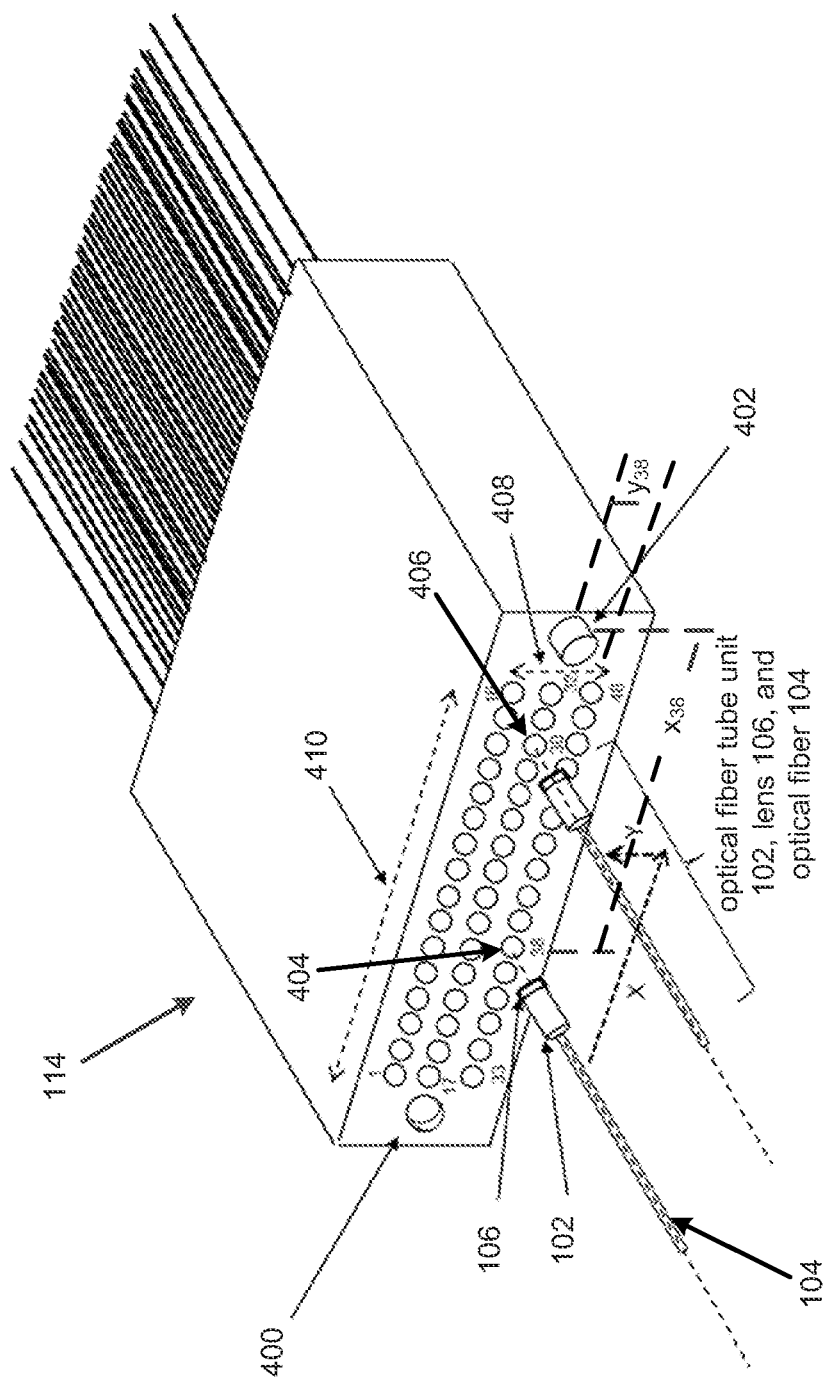
FIG. 4 illustrates movement of an optical fiber usable with the mechanical transfer ferrule based optical switch of FIG. 1 in accordance with an example of the present disclosure.

FIG. 4 illustrates movement of an optical fiber usable with the switch 100 in accordance with an example of the present disclosure.

Referring to FIG. 4, as disclosed herein, the optical fiber tube unit positioning assembly 108 may include a protrusion (not shown) to align to a complementary positioning slot 400 in the mufti-fiber connector 114. Alternatively or additionally, the optical fiber tube unit positioning assembly may include an indentation (not shown) to align to a complementary positioning pin 402 of the multi-fiber connector 114.

For the example of FIG. 4, the mufti-fiber connector 114 may include 48 channels, disposed in three rows of 16 channels each (e.g., channels 1-16, 17-32, and 33-48). As disclosed herein, the optical fiber tube unit positioning assembly 108 may include an optical fiber tube unit guide 112 to operatively position the optical fiber tube unit support 110 relative to the ti-fiber connector 114 to align the optical fiber tube unit 102 and the lens 106 to a specified lens of the multi-fiber connector 114, and to connect the optical fiber 104 to a specified optical fiber channel. For example, as shown in FIG. 4, the specified optical fiber channel may include channel 38 as shown at 404, or channel 30 as shown at 406.

The optical fiber tube unit support 110 may include a translation element to move (e.g., as controlled by the controller 116) the optical fiber tube unit 102 and the lens 106 in a first direction (e.g., y-direction at 408) relative to the multi-fiber connector 114. Further, the optical fiber tube unit guide 112 may include another translation element to move (e.g., as controlled by the controller 116) the optical fiber tube unit support 110 in a second direction (e.g., x-direction at 410) relative to the multi-fiber connector 114. The second direction may be generally orthogonal to the first direction.

With respect to positioning of the optical fiber tube unit support 110 relative to the multi-fiber connector 114 to align the optical fiber tube unit 102 and the lens 106 to a specified lens of the multi-fiber connector 114, and to connect the optical fiber 104 to a specified optical fiber channel, the controller 116 may be programmed based, for example, on the lens layout of the multi-fiber connector 114. For example, the lens layout of the multi-fiber connector 114 may include one row of lenses (e.g., see FIG. 7), a plurality of rows of lenses as shown in FIG. 4, or another arrangement (e.g., staggered, non-uniform, triangular, oval, etc.) of the lenses. In this regard, depending on the arrangement of the lenses and the associated location of the lenses relative to an origin point (e.g., the positioning slot 400, the positioning pin 402, or another location) of the multi-fiber connector 114, the controller 116 may control alignment of the optical fiber tube unit 102 and the lens 106 with respect to a specified lens of the multi-fiber connector 114. For example, assuming that the lens corresponding to the channel 30 is located at dimension $x_{30}$, $y_{30}$ relative to a centroid of the positioning pin 402, and the lens corresponding to the channel 38 is located at dimension $x_{38}$, $y_{38}$ relative to the centroid of the positioning pin 402, for channel 30, the controller 116 may control movement of the optical fiber tube unit 102 and the lens 106 with respect to the lens corresponding to the channel 30 based on the dimension $x_{30}$, $y_{30}$ relative to the centroid of the positioning pin 402. Similarly, for channel 38, the controller 116 may control movement of the optical fiber tube unit 102 and the lens 106 with respect to the lens corresponding to the channel 38 based on the dimension $x_{38}$, $y_{38}$ relative to the centroid of the positioning pin 402.

Figure 5:
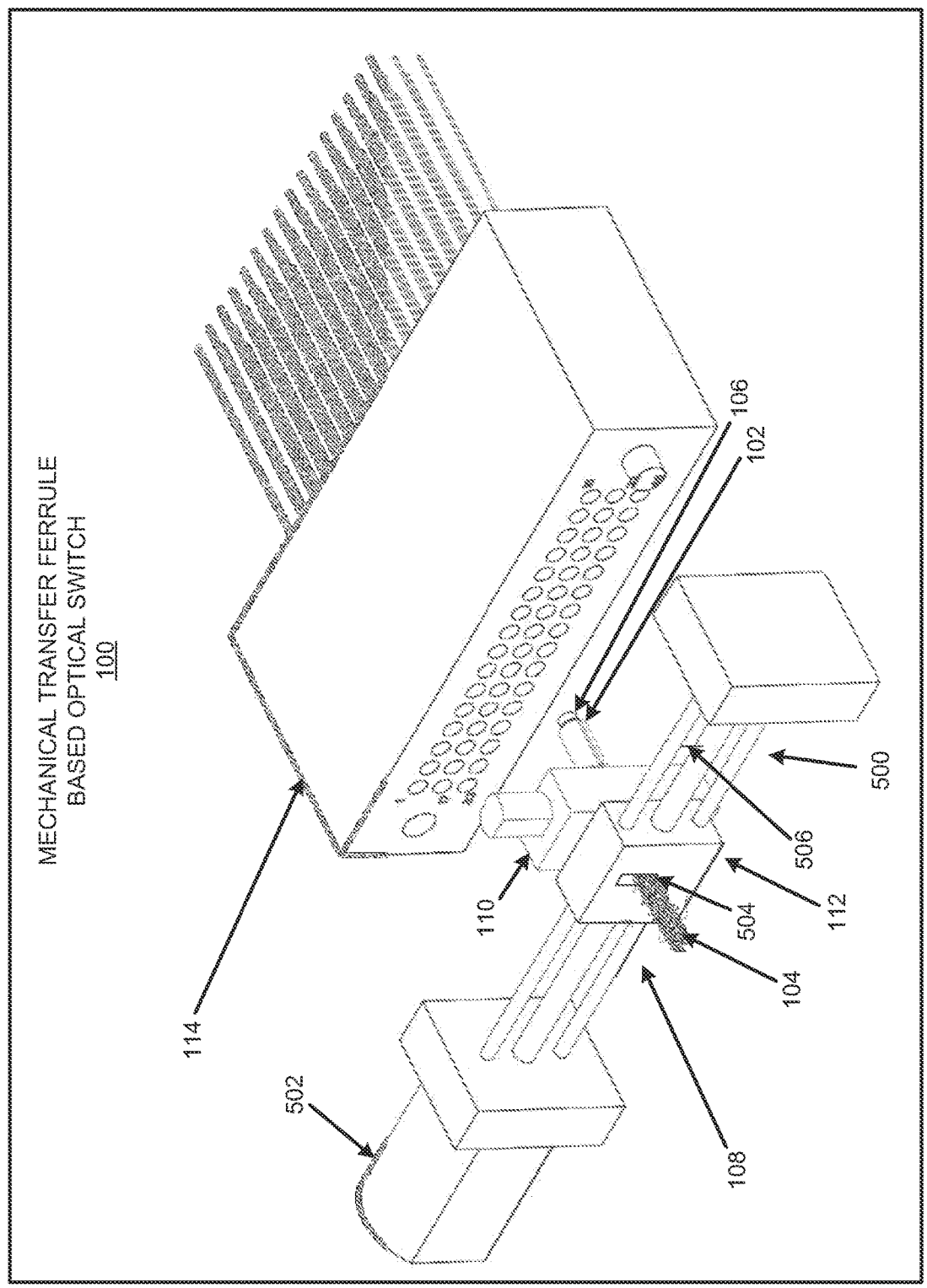
FIG. 5 illustrates an optical fiber tube unit positioning assembly and a multi-fiber connector of the mechanical transfer ferrule based optical switch of FIG. 1 in accordance with an example of the present disclosure.

FIG. 5 illustrates the optical fiber tube unit positioning assembly 108 and the multi-fiber connector 114 of the switch 100 in accordance with an example of the present disclosure.

Referring to FIG. 5, the optical fiber tube unit positioning assembly 108 may include the optical fiber tube unit support 110 detachably connectable to the optical fiber tube unit 102. Further, the optical fiber tube unit positioning assembly 108 may include the optical fiber tube unit guide 112 to operatively position the optical fiber tube unit support 110 relative to the multi-fiber connector 114 to align the optical fiber tube unit 102 and the lens 106 to a specified lens of the multi-fiber connector 114, and to connect the optical fiber 104 to a specified optical fiber channel. For the example of FIG. 5, the optical fiber tube unit guide 112 may include three tracks 500, and a translation element 502 (controlled by the controller 116) that includes a motor that imparts rotation on the central track that may include a corresponding gear or worm arrangement to move (e.g., in x-direction at 410 of FIG. 4) the optical fiber tube unit support 110. Alternatively, the translation element 502 may include any type of configuration to impart a linear translation of the optical fiber tube unit support 110 in the x-direction at 410 of FIG. 4. Yet further, with respect to the three tracks 500 of the optical fiber tube unit guide 112, although the upper and lower (in the orientation of FIG. 5) tracks are shown at an equal distance from the central track, the upper (or lower) tracks may be disposed at non-equal distances from the central track. This is because the y-dimension of the slot 504 that permits vertical movement (e.g., in the y-direction at 408, and in the orientation of FIG. 5) of the input optical fiber 104 may be at least equal to the gap at 506 between the upper and middle tracks. For the multi-fiber connector 114 that includes three rows of 16 lenses as shown in FIG. 5, the slot dimension may be further increased (compared to the illustration of FIG. 5) to allow for y-direction movement of the input optical fiber 104 with respect to the upper row that includes lenses 1-16, the middle row that includes lenses 17-32, and the bottom row that includes lenses 33-48. Other such arrangements may be provided to permit movement of the input optical fiber 104 in the y-direction.

Figure 6:
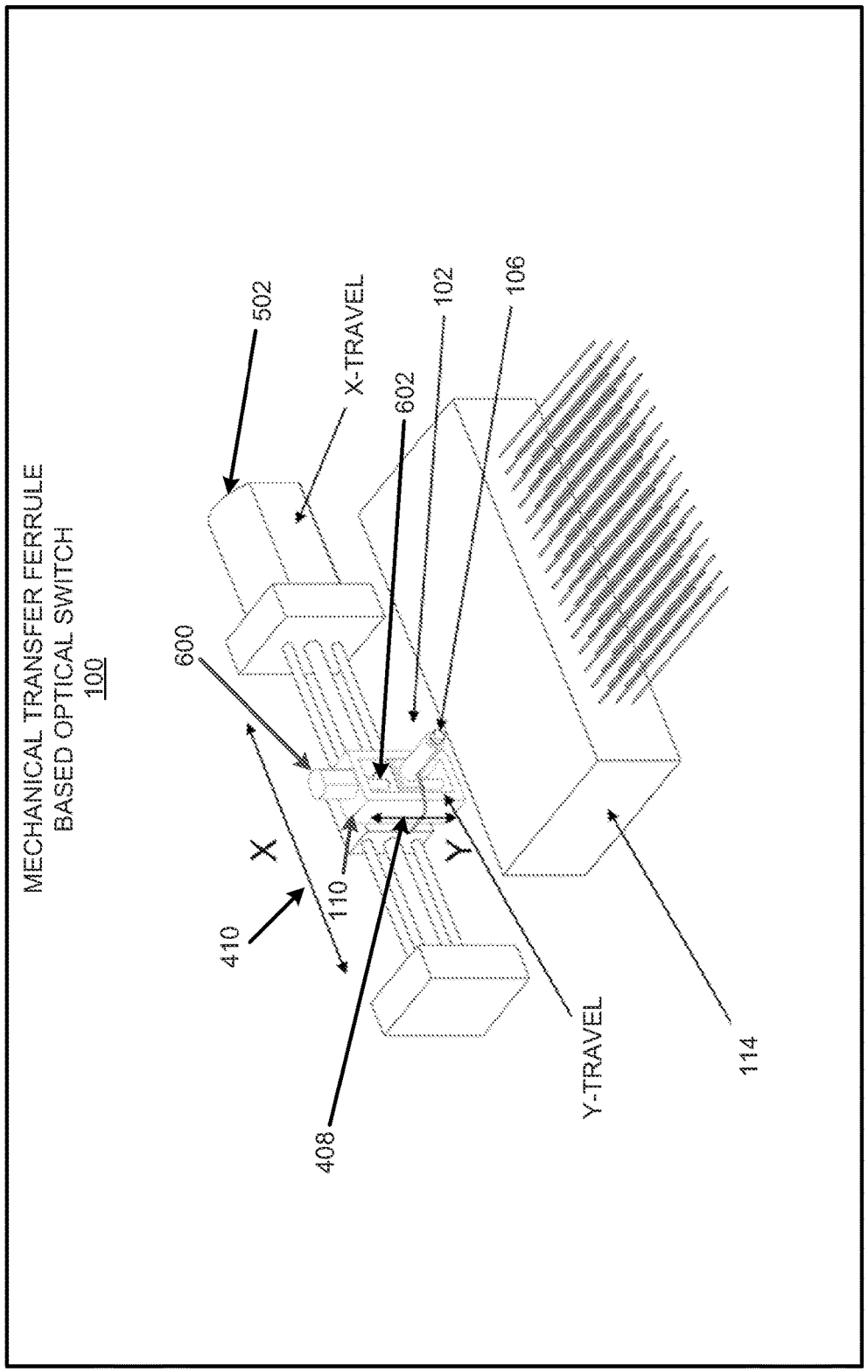
FIG. 6 illustrates operation of the optical fiber tube unit positioning assembly of the mechanical transfer ferrule based optical switch of FIG. 1 in accordance with an example of the present disclosure.

FIG. 6 illustrates operation of the optical fiber tube unit positioning assembly 108 of the switch 100 in accordance with an example of the present disclosure.

Referring to FIG. 6, the optical fiber tube unit support 110 may include a translation element 600 (controlled by the controller 116) to move the optical fiber tube unit 102 and the lens 106 in a first direction (e.g., in y-direction at 408 of FIG. 4) relative to the multi-fiber connector 114. For the example of FIG. 6, the translation element 600 may include a motor that imparts rotation on rod 602 that may include a corresponding gear or worm arrangement to move (e.g., in y-direction at 408 of FIG. 4) the optical fiber tube unit 102 and the lens 106. Alternatively, the translation element 600 may include any type of configuration to impart a linear translation of the optical fiber tube unit 102 and the lens 106 in the y-direction at 408 of FIG. 4.

As discussed above with reference to FIG. 4, with respect to control of movement of the optical fiber tube unit 102 and the lens 106 to the lens corresponding to specified optical fiber channel, assuming that the lens corresponding to the channel 30 (e.g., see FIG. 4) is located at dimension $x_{30}$, $y_{30}$ relative to a centroid of the positioning pin 402, and the lens corresponding to the channel 38 is located at dimension $x_{38}$, $y_{38}$ relative to the centroid of the positioning pin 402, for channel 30, the controller 116 may control the translation element 600 to move (e.g., in a y-direction at 408 of FIG. 4) the optical fiber tube unit 102 and the lens 106 to the lens corresponding to the channel 30 based on the dimension $y_{30}$ relative to the centroid of the positioning pin 402. Further, for channel 38, the controller 116 may control the translation element 600 to move (e.g., in a y-direction at 408 of FIG. 4) the optical fiber tube unit 102 and the lens 106 to the lens corresponding to the channel 38 based on the dimension $y_{38}$ relative to the centroid of the positioning pin 402. Further, for channel 30, the controller 116 may control the translation element 502 to move (e.g., in a x-direction at 410 of FIG. 4) the optical fiber tube unit support 110 to the lens corresponding to the channel 30 based on the dimension $x_{30}$ relative to the centroid of the positioning pin 402. Similarly, for channel 38, the controller 116 may control the translation element 502 to move (e.g., in a x-direction at 410 of FIG. 4) the optical fiber tube unit support 110 to the lens corresponding to the channel 38 based on the dimension $x_{38}$ relative to the centroid of the positioning pin 402.

Figure 7:
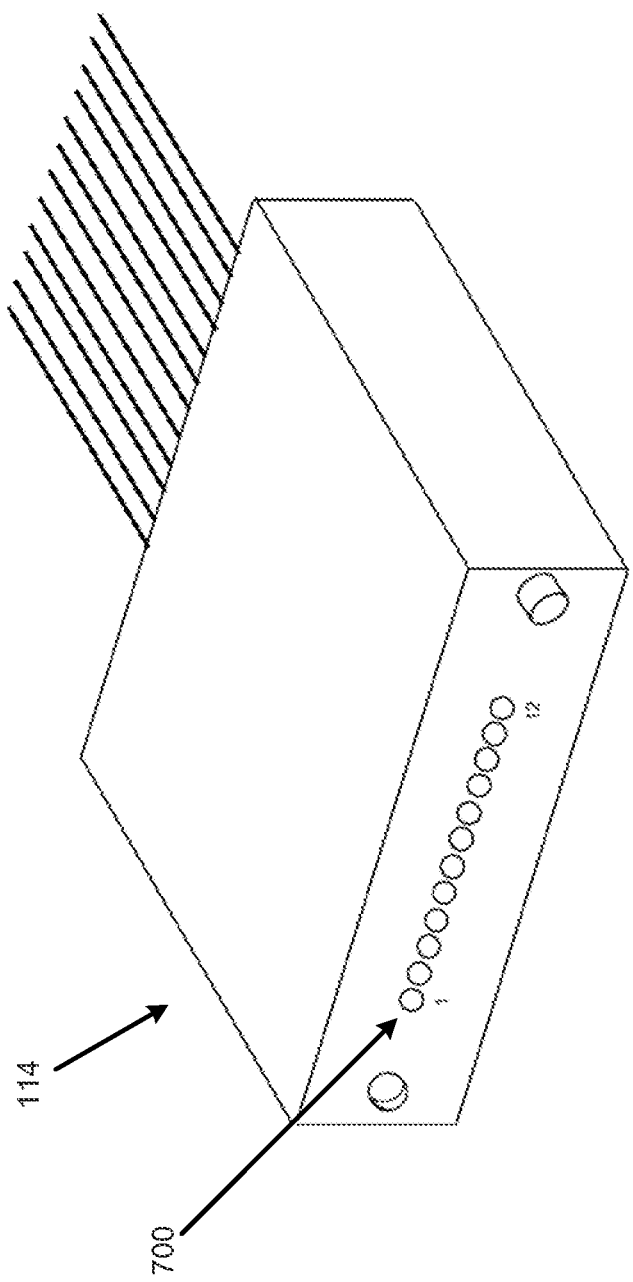
FIG. 7 illustrates a multi-fiber connector including a single row of lenses of the mechanical transfer ferrule based optical switch of FIG. 1 in accordance with an example of the present disclosure.

FIG. 7 illustrates the multi-fiber connector 114 including a single row of lenses of the switch 100 in accordance with an example of the present disclosure.

Referring to FIG. 7, the multi-fiber connector 114, which may also be referred to as a lensed MT ferrule or an expanded beam MT ferrule, for the switch 100 may include various configurations. For example, the multi-fiber connector 114 may include one row of 12 lensed MT ferrules as shown at 700 in FIG. 7, one row of 16 lensed MT ferrules (not shown), or any number of lensed MT ferrules.

Figure 8:
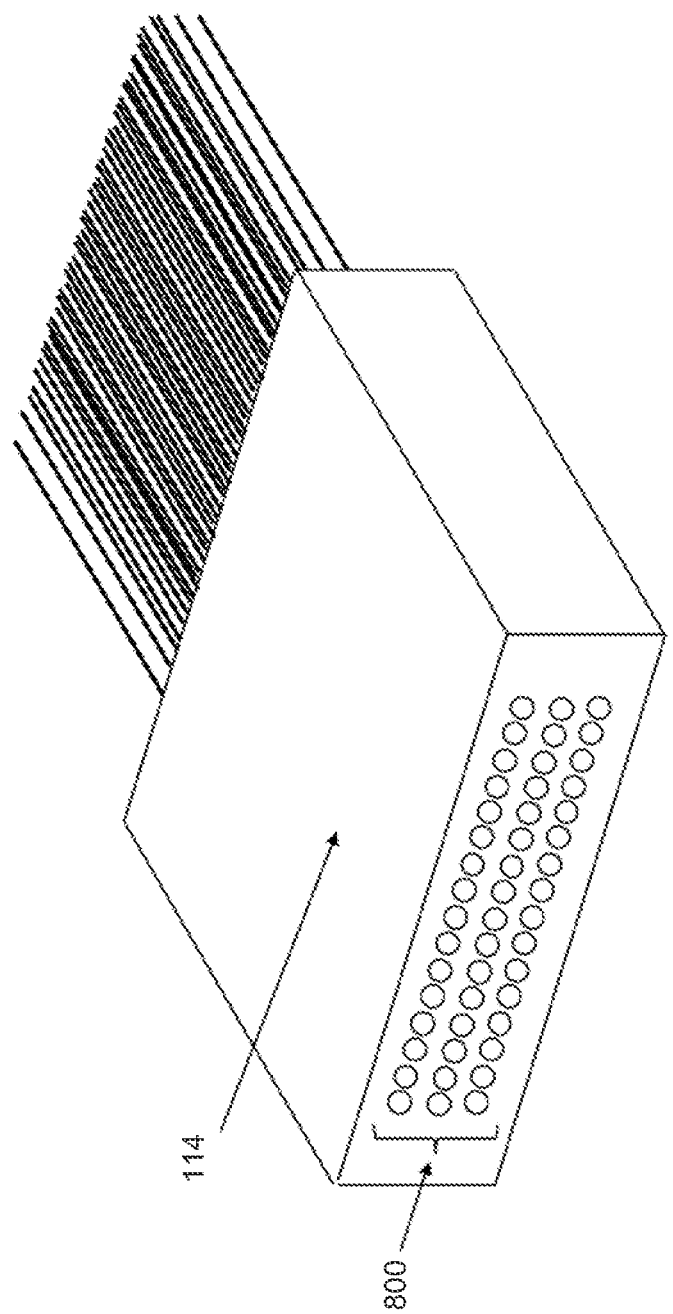
FIG. 8 illustrates a multi-fiber connector including a plurality of rows of lenses of the mechanical transfer ferrule based optical switch of FIG. 1 in accordance with an example of the present disclosure.

FIG. 8 illustrates the multi-fiber connector 114 including a plurality of rows of lenses of the switch 100 in accordance with an example of the present disclosure.

Referring to FIG. 8, the multi-fiber connector 114 may include three rows of 16 lensed MT ferrules as shown at 800, or any number of rows or another arrangement of lensed MT ferrules.

Referring again to FIG. 1, the multi-fiber connector 114 may be operable with optical fibers that include multimode fibers. The multi-fiber connector 114 may also be operable with optical fibers that include single mode fibers. In this regard, the switch 100 may be a multimode or single mode optical switch. For example, the switch 100 may be a 1*12 to 1*64 (or more) optical switch of relatively small overall dimensions. The 1*12 switch 100 may include a single row of 12 lensed MT ferrules as shown at 700 in FIG. 7. The 1*64 switch 100 may include, for example, four rows of 16 lensed MT ferrules, in a similar manner as shown for the three rows of 16 lensed MT ferrules as shown at 800 of FIG. 8.

The switch 100 may represent a free space optical design made with a low number of optical components. The optical components assembled into the switch 100 may present low intrinsic optical losses and nearly no wavelength and polarization dependency. In this regard, the input light beam from the input optical fiber 104, the optical fiber tube unit 102, and the lens 106 may be directly connected to a specified output fiber channel without passing through additional components that may create additional optical losses.

FIG. 9 illustrates a flowchart of a method 900 for implementing a mechanical transfer ferrule based optical switch, according to examples. The method 900 may be implemented on the switch 100 described above with reference to FIGS. 1-8 by way of example and not limitation. The method 900 may be practiced in other switches.

Referring to FIGS. 1-9, and particularly FIG. 9, at block 902, the method 900 may include receiving identification of a specified optical fiber channel.

At block 904, the method 900 may include aligning, based on the specified optical fiber channel, by an optical fiber tube unit positioning assembly 108, an optical fiber tube unit 102 connectable to an end of an optical fiber 104 to a specified lens of a multi-fiber connector 114.

At block 906, the method 900 may include connecting, based on the alignment of the optical fiber tube unit 102 to the specified lens of the multi-fiber connector 114, the optical fiber 104 to the specified optical fiber channel.

According to examples disclosed herein, the method 900 may include moving the optical fiber tube unit 102 in a first direction relative to the multi-fiber connector 114, and moving the optical fiber tube unit 102 in a second direction relative to the multi-fiber connector 114, where the second direction is generally orthogonal to the first direction.

According to examples disclosed herein, the method 900 may include aligning the optical fiber tube unit positioning assembly 108 to a positioning slot in the multi-fiber connector 114 (e.g., see positioning slot 400 of FIG. 4).

According to examples disclosed herein, the method 900 may include aligning the optical fiber tube unit positioning assembly 108 to a positioning pin of the multi-fiber connector 114 (e.g., see positioning pin 402 of FIG. 4).

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A mechanical transfer ferrule based optical switch comprising:
    an optical fiber tube unit connectable to an end of an optical fiber, the optical fiber tube unit including a lens to transmit light through the optical fiber; and
    an optical fiber tube unit positioning assembly including
        an optical fiber tube unit support detachably connectable to the optical fiber tube unit, wherein the optical fiber tube unit support includes a translation element to move the optical fiber tube unit and the lens in a first direction relative to a multi-fiber connector, and
        an optical fiber tube unit guide to move, based on movement of the optical fiber tube unit support and the optical fiber tube unit guide, the optical fiber in at least two orthogonal directions, wherein the optical fiber tube unit guide includes another translation element to move the optical fiber tube unit support in a second direction relative to the multi-fiber connector, wherein the second direction is generally orthogonal to the first direction.

2. The mechanical transfer ferrule based optical switch according to claim 1, wherein the optical fiber tube unit positioning assembly includes a protrusion to align to a positioning slot in a multi-fiber connector.

3. The mechanical transfer ferrule based optical switch according to claim 1, wherein the optical fiber tube unit positioning assembly includes an indentation to align to a positioning pin of a multi-fiber connector.

4. The mechanical transfer ferrule based optical switch according to claim 1, wherein a multi-fiber connector comprises a single row of lenses.

5. The mechanical transfer ferrule based optical switch according to claim 1, wherein a multi-fiber connector comprises a plurality of rows of lenses.

6. The mechanical transfer ferrule based optical switch according to claim 1, wherein the optical fiber tube unit is connectable to the optical fiber that includes a multimode fiber.

7. The mechanical transfer ferrule based optical switch according to claim 1, wherein the optical fiber tube unit is connectable to the optical fiber that includes a single mode fiber.

8. The mechanical transfer ferrule based optical switch according to claim 1, wherein the optical fiber tube unit guide is to operatively position the optical fiber tube unit support relative to a multi-fiber connector to align the optical fiber tube unit and the lens to a specified lens of the multi-fiber connector, and connect the optical fiber to a specified optical fiber channel.

9. A method of implementing a mechanical transfer ferrule based optical switch, the method comprising:
    receiving identification of a specified optical fiber channel; and
    aligning, based on the specified optical fiber channel and based on movement of an optical fiber in at least two orthogonal directions, by an optical fiber tube unit positioning assembly, an optical fiber tube unit connectable to an end of the optical fiber to a specified lens of a multi-fiber connector, wherein the optical fiber tube unit positioning assembly includes an optical fiber tube unit support that includes a translation element to move the optical fiber tube unit and a lens relative to the multi-fiber connector, and
    the aligning further comprises moving the optical fiber tube unit in a first direction relative to the multi-fiber connector, and
    moving the optical fiber tube unit in a second direction relative to the multi-fiber connector, wherein the second direction is generally orthogonal to the first direction; and
    connecting, based on the alignment of the optical fiber tube unit to the specified lens of the multi-fiber connector, the optical fiber to the specified optical fiber channel.

10. The method of implementing a mechanical transfer ferrule based optical switch according to claim 9, further comprising:
    aligning the optical fiber tube unit positioning assembly to a positioning slot in the multi-fiber connector.

11. The method of implementing a mechanical transfer ferrule based optical switch according to claim 9, further comprising:
    aligning the optical fiber tube unit positioning assembly to a positioning pin of the multi-fiber connector.

12. The method of implementing a mechanical transfer ferrule based optical switch according to claim 9,
    wherein the multi-fiber connector comprises a single row of lenses including the specified lens, or
    wherein the multi-fiber connector comprises a plurality of rows of lenses including the specified lens.

13. An optical switch comprising:
    an optical fiber tube unit positioning assembly including
        an optical fiber tube unit support, wherein the optical fiber tube unit support includes a translation element to move an optical fiber tube unit and a lens in a first direction relative to a multi-fiber connector; and
        an optical fiber tube unit guide to move, based on movement of the optical fiber tube unit support and the optical fiber tube unit guide, an optical fiber in at least two orthogonal directions, wherein the optical fiber tube unit guide includes another translation element to move the optical fiber tube unit support in a second direction relative to the multi-fiber connector, wherein the second direction is generally orthogonal to the first direction.

14. The optical switch according to claim 13, wherein the optical fiber tube unit is connectable to an end of the optical fiber, and includes the lens to transmit light through the optical fiber.

15. The optical switch according to claim 14, wherein the optical fiber tube unit guide is to operatively position the optical fiber tube unit support relative to the multi-fiber connector to
 align the optical fiber tube unit and the lens to a specified lens of the multi-fiber connector, and
 connect the optical fiber to a specified optical fiber channel.

16. The optical switch according to claim 13, wherein the optical fiber tube unit positioning assembly includes the optical fiber positioned generally centrally relative to the optical fiber tube unit positioning assembly.

17. The optical switch according to claim 13, wherein the optical fiber tube unit guide includes the optical fiber positioned through the optical fiber tube unit guide.

* * * * *